(12) United States Patent
Komatsu et al.

(10) Patent No.: US 6,499,210 B2
(45) Date of Patent: Dec. 31, 2002

(54) METHOD OF ACCURATELY AND EASILY MOUNTING A DRIVE MOTOR TO A FRAME MEMBER IN ASSEMBLING A DISK DRIVE FOR DRIVING A FLEXIBLE DISK

(75) Inventors: Hisateru Komatsu, Tendo (JP); Mamoru Takahashi, Murayama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/745,053

(22) Filed: Dec. 20, 2000

(65) Prior Publication Data

US 2001/0004796 A1 Jun. 28, 2001

(30) Foreign Application Priority Data

Dec. 28, 1999 (JP) ............................................. 11-372578

(51) Int. Cl.$^7$ ............................................... H02K 15/06
(52) U.S. Cl. ....................................... 29/596; 29/603.03
(58) Field of Search .............................. 29/603.03, 596, 29/898.07, 464; 360/99.08, 99.04

(56) References Cited

U.S. PATENT DOCUMENTS 5,309,628 A * 5/1994 Fukuchi et al. ................ 29/759
5,337,374 A * 8/1994 Konishikawa ............... 384/107
5,870,248 A * 2/1999 Akutsu et al. ........... 360/99.04
5,942,820 A * 8/1999 Yoshia ......................... 310/67
6,049,147 A * 4/2000 Sanada et al. ................. 310/42

* cited by examiner

Primary Examiner—S. Thomas Hughes
Assistant Examiner—Stephen Kenny
(74) Attorney, Agent, or Firm—Frishauf, Holtz, Goodman & Chick, P.C.

(57) ABSTRACT

In a method of mounting a drive motor to a frame member included in a disk drive which is for driving a flexible disk, the frame member is formed to have a main frame portion and a motor frame portion integrally formed to the main frame portion. The main frame portion defines a position of the flexible disk in the disk drive. Use is made of a jig adapted to engage with the main frame portion and a bearing portion provided to a stator of the drive motor. On positioning the stator relative to the motor frame portion, the jig is engaged with the main frame portion and the bearing portion. Under this state, the stator is fixed to the motor frame portion. After that, the bearing portion rotatably supports a rotation shaft coupled to a rotor of the drive motor.

6 Claims, 8 Drawing Sheets

METHOD OF ACCURATELY AND EASILY MOUNTING A DRIVE MOTOR TO A FRAME MEMBER IN ASSEMBLING A DISK DRIVE FOR DRIVING A FLEXIBLE DISK

BACKGROUND OF THE INVENTION

This invention relates to a disk drive for driving a flexible disk or a floppy disk to carry out a data-recording operation and/or a data-reproducing operations to and/or from the flexible disk and, in particular, to a method of mounting a drive motor to a frame member in assembling the disk drive.

A disk drive of the type is widely used and mounted in a portable electronic equipment such as a laptop personal computer, a notebook computer, or a notebook word processor. The disk drive comprises a magnetic head for reading/writing data from/to a flexible disk, a carriage assembly supporting the magnetic head, a stepping motor for moving the carriage assembly with respect to the flexible disk, and a drive motor called a spindle motor or a direct drive motor for driving and rotating the flexible disk.

In the manner known in the art, a mounting operation of mounting the drive motor into the disk drive is carried out by the use of a rotation shaft of a rotor (or a disk table integrally coupled with the rotation shaft) as the reference. With the manner, a gap is left between the rotation shaft of the rotor and the bearing portion of the stator. Therefore, the drive motor may possibly be positioned in the state in which the rotation shaft is eccentric or decentered within the bearing portion.

Upon the mounting operation, the drive motor is preliminarily mounted into the motor frame. Thereafter, the motor frame with the drive motor mounted therein is positioned with respect to the main frame. Then, the motor frame is fixed to the main frame. Thus, the mounting operation is troublesome.

SUMMARY OF THE INVENTION

It is therefore an object of the present invention to provide a method of mounting a drive motor to a frame member in assembling a disk drive, which is capable of accurately and easily positioning and mounting the drive motor.

Other objects of the present invention will become clear as the description proceeds.

According to the present invention, there is provided a method of mounting a drive motor to a frame member included in a disk drive which is for driving a flexible disk. The drive motor comprises a stator fixed to the frame member and having a bearing portion, a rotation shaft rotatably supported by the bearing portion, and a rotor coupled to the rotation shaft for being engaged with the flexible disk. The method comprises the step of forming the frame member to have a main frame portion and a motor frame portion integrally formed to the main frame portion. The main frame portion defines a position of the flexible disk in the disk drive. The method further comprises the steps of preparing a jig adapted to engage with the main frame portion and the bearing portion, engaging the jig with the main frame portion and the bearing portion to position the stator relative to the motor frame portion, fixing the stator to the motor frame portion, and coupling the rotation shaft to the bearing portion.

DESCRIPTION OF THE PREFERRED EMBODIMENT

Figure 1:
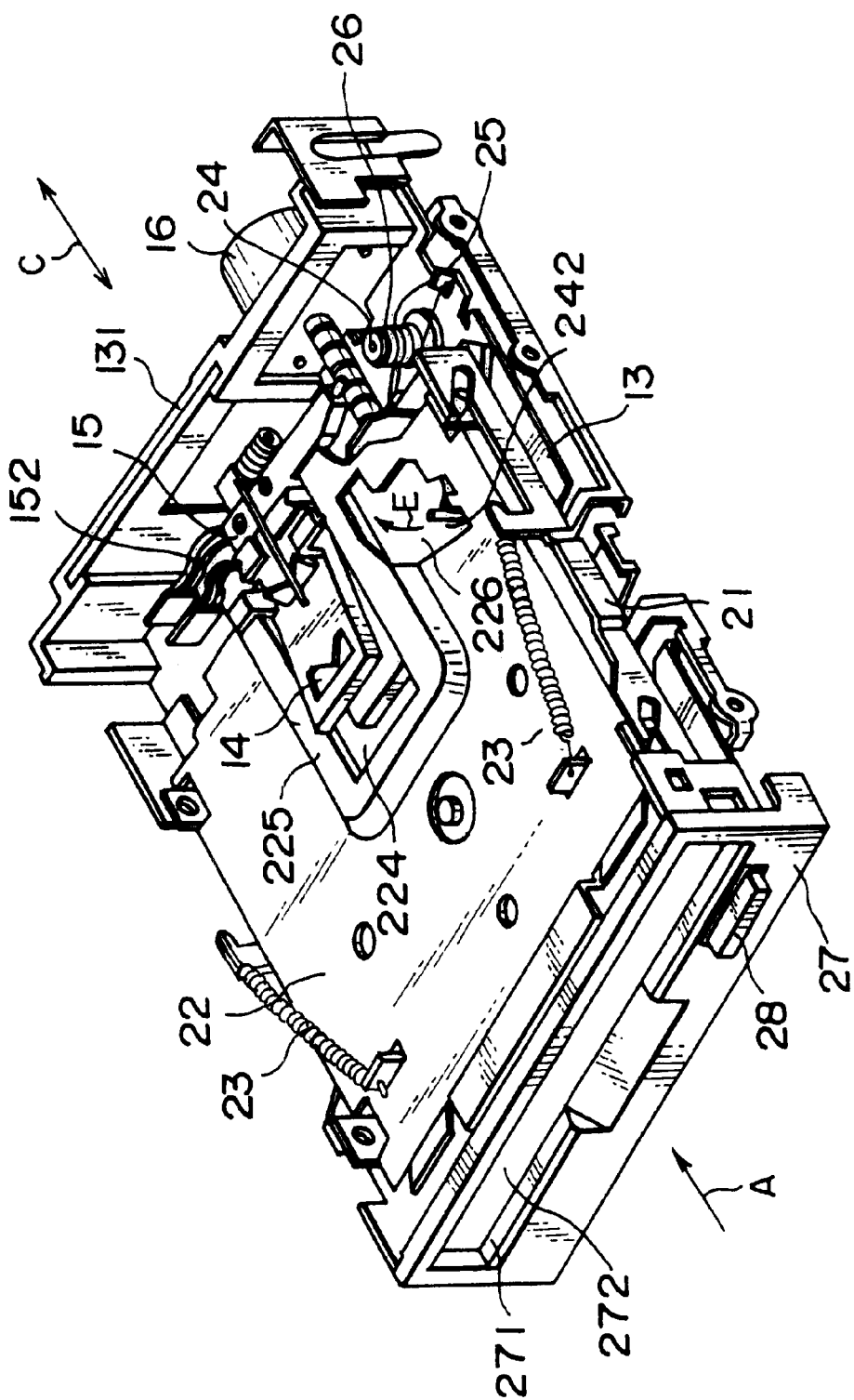
FIG. 1 is an external perspective view of a conventional existing disk drive.
Figure 2:
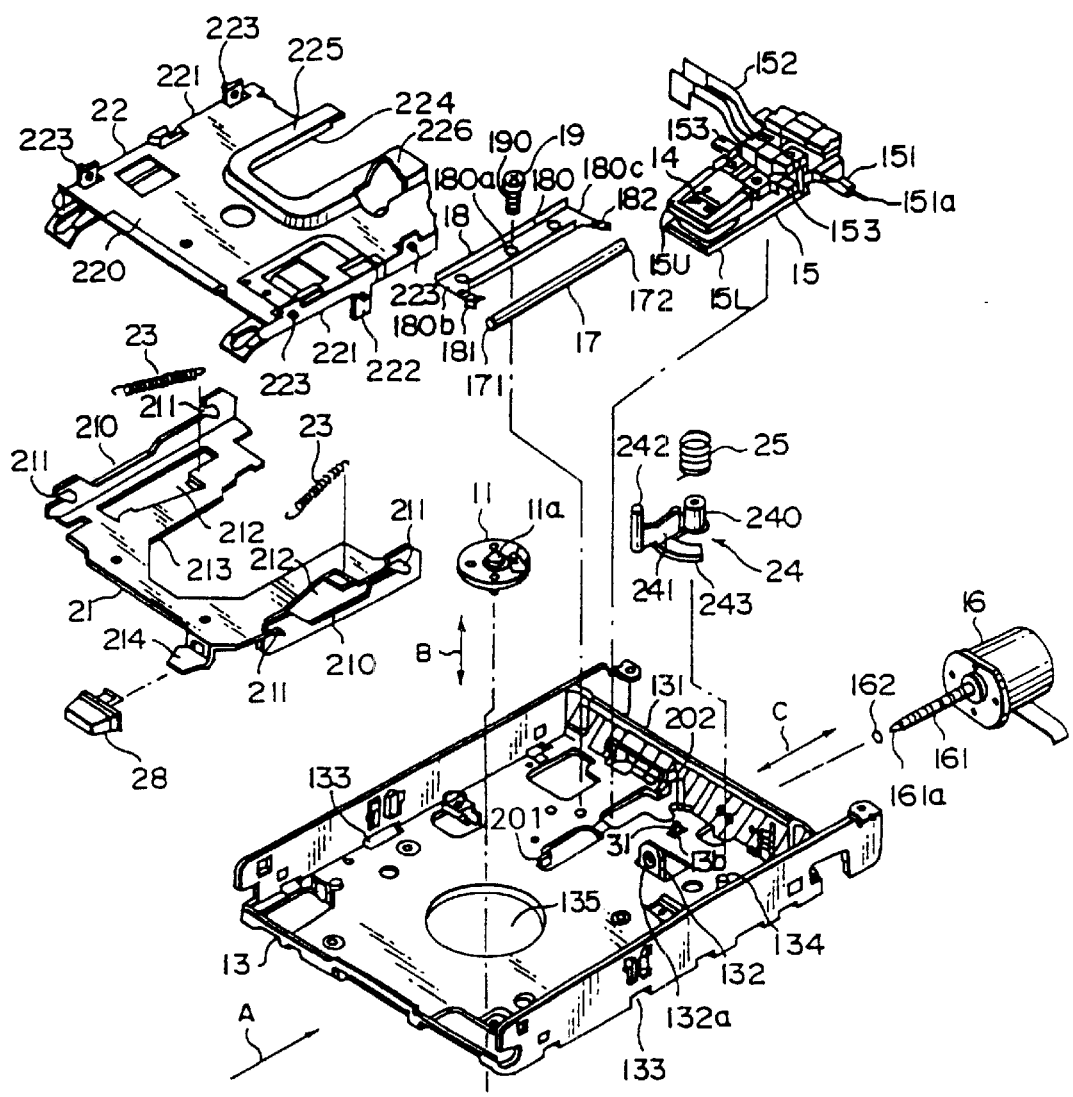
FIG. 2 is an exploded perspective view of the disk drive illustrated in FIG. 1.

For facilitating a better understanding of the present invention, a conventional disk drive will at first be described with reference to FIGS. 1 and 2.

The disk drive illustrated in the figure is for carrying out data recording/reproducing operations for a 3.5-inch flexible disk which is well known in the art. The flexible disk is inserted into the disk drive in an inserting direction depicted by an arrow A. The flexible disk thus inserted is held on a disk table 11 having a rotation shaft 11a in the state where the rotation shaft 11a of the disk table 11 is coincident with a center axis of the flexible disk. As will later be described, the disk table 11 is rotatably supported on a first or upper surface of a main frame 13. The rotation shaft 11a of the disk table 11 has an axial direction B parallel to a thickness direction of the main frame 13. Driven by a drive motor (which will later be described) called a spindle motor or a direct drive motor and mounted on a second or lower surface of the main frame 13, the disk table 11 is rotated so that a magnetic recording medium contained in the flexible disk is rotated. On the lower surface of the main frame 13, a substrate or board (not shown) with a number of electronic parts mounted thereon is attached.

The disk drive comprises a pair of upper and lower magnetic heads 14 (only the upper one being illustrated in the figure) for reading/writing data from/to the magnetic recording medium in the flexible disk. The magnetic heads 14 are supported by a carriage assembly 15 arranged on a rear side of the disk drive. Specifically, the carriage assembly 15 comprises an upper carriage 15U supporting the upper magnetic head 14 and a lower carriage 15L supporting the lower magnetic head 14. As will later be described, the carriage assembly 15 is disposed on the upper surface of the main frame 13 with a space kept from the main frame 13. The carriage assembly 15 supports the magnetic heads 14 at its tip so that the magnetic heads 14 are movable with respect to the flexible disk in a predetermined radial direction depicted by an arrow C.

The main frame 13 has a rear side wall 131 provided with a stepping motor 16 fixed thereto. The stepping motor 16 serves to linearly drive the carriage assembly 15 in the predetermined radial direction C. Specifically, the stepping motor 16 has a rotation shaft 161 extending in parallel to the predetermined radial direction C. The rotation shaft 161 is threaded to form a male screw. The rotation shaft 161 has a tip 161a. On the other hand, the main frame 13 has a bent portion 132 formed by a cut-and-bend process to stand up on its upper surface. The bent portion 132 is provided with a hole 132a. The tip 161a of the rotation shaft 161 penetrates the hole 132a of the bent portion 132. The tip 161a of the rotation shaft 161 is provided with a steel ball 162. By the hole 132a and the steel ball 162, the rotation shaft 161 is defined in position to extend in parallel to the predetermined radial direction C and the tip 161a of the rotation shaft 161 is rotatably held.

On the other hand, the carriage assembly 15 comprises an arm 151 extending from the lower carriage 15L to the rotation shaft 161. The arm 151 has an arm end 151a engaged with a root of the male screw of the rotation shaft 161. Therefore, when the rotation shaft 161 of the stepping motor 16 is rotated, the arm end 151a of the arm 151 is moved along the root of the male screw of the rotation shaft 161 so that the carriage assembly 15 itself is moved in the predetermined radial direction C.

The rotation shaft 161 of the stepping motor 16 is disposed on one side of the carriage assembly 15. Therefore, the one side of the carriage assembly 15 is movably supported by the rotation shaft 161 with a space kept from the frame 13. However, only by the rotation shaft 161 supporting the one side, the whole of the carriage assembly 15 can not be kept spaced from the upper surface of the main frame 13. Therefore, the other side of the carriage assembly 15 is supported by a guide bar 17 to guide the movement of the carriage assembly 15. Thus, the rotation shaft 161 of the stepping motor 16 and the guide bar 17 are arranged on the one side and on the other side of the carriage assembly 15. The guide bar 17 extends in parallel to the predetermined radial direction C and has one end 171 and the other end 172 fixed on the upper surface of the main frame 13 as will later be described. The guide bar 17 serves to guide the carriage assembly 15 in the predetermined radial direction C. With this structure, the whole of the carriage assembly 15 is kept spaced from the upper surface of the main frame 13.

In addition, a plurality of flexible printed circuits (FPC) 152 extend from the carriage assembly 15 on the side of the guide bar 17. The FPCs 152 are electrically connected to the substrate (not shown) attached to the lower surface of the main frame 13.

The guide bar 17 is clamped on the upper surface of the main frame 13 by a guide bar clamp 18. The guide bar clamp 18 is fixed at its center to the upper surface of the main frame 13 by the use of a binding screw 19. Specifically, the guide bar clamp 18 comprises a rectangular fixing member 180 slightly longer in length than the guide bar 17. The rectangular fixing member 180 is provided with a hole 180a formed approximately at its center to allow the insertion of a screw shaft 190 of the binding screw 19. The rectangular fixing member 180 has one end 180b and the other end 180c provided with a pair of arms 181 and 182 extending therefrom to clamp the one end 171 and the other end 172 of the guide bar 17, respectively.

Since the guide bar clamp 18 merely clamps the guide bar 17, the guide bar 17 can not be fixed to the upper surface of the main frame 13 by the guide bar clamp 18 alone. Therefore, a pair of positioning members for defining positions of the one end 171 and the other end 172 of the guide bar 17 are required. The positioning members are implemented by a pair of bent portions 201 and 202 each of which is formed by cutting and bending a part of the main frame 13 to stand up from the upper surface of the main frame 13.

The lower carriage 15L of the carriage assembly 15 also serves as a supporting frame supporting the carriage assembly 15 so that the carriage assembly 15 is slidable along the guide bar 17. The lower carriage 15L has a projecting portion (not shown) projecting towards the guide bar 17. The guide bar 17 is slidably fitted in the projecting portion.

The disk drive further comprises an eject plate 21 and a disk holder 22. Each of the main frame 13, the eject plate 21, and the disk holder 22 is formed by punching, pressing, and bending a metal plate. The eject plate 21 is mounted on the main frame 13 to be slidable in the inserting direction A of the flexible disk and an ejecting direction opposite thereto. In the manner which will later be described, the eject plate 21 holds the flexible disk in cooperation with the disk holder 22 when the disk drive is operated. In order to allow the flexible disk to be inserted into the disk drive and to be ejected from the disk drive, the eject plate 21 holds the flexible disk so that the flexible disk is slidable in the inserting direction A and the ejecting direction. The eject plate 21 comprises a pair of side walls 210 faced to each other. Each of the side walls 210 has a pair of cam portions 211. In addition, the eject plate 21 has a bottom wall provided with a pair of cut portions 212 formed along the both side walls 210, respectively, and a generally U-shaped opening portion 213 formed at a center portion thereof to surround the disk table 11. Furthermore, the eject plate 21 has a lower surface provided with a pin (which will later be described). The pin is adapted to be engaged with a locking part of an eject lever which will later be described.

The disk holder 22 is disposed on the eject plate 21. The disk holder 22 has a principal surface 220 and a pair of side walls 221 formed at both lateral ends of the principal surface 220 to face each other. The both side walls 221 are provided with projections 222 (only one being illustrated), respectively. The projections 222 are inserted into a pair of holes 133 formed in the main frame 13 through the cut portions 212 of the eject plate 21, respectively. By inserting the projections 222 into the holes 133 of the main frame 13, the disk holder 22 is positioned with respect to the main frame 13 in the inserting direction A. Simultaneously, the disk holder 22 is allowed to perform reciprocating movement in the axial direction B of the rotation shaft 11a of the disk table 11. Each of the both side walls 221 has a pair of pins 223. The pins 223 are inserted in the cam portions 211 formed in each of the side walls 210 of the eject plate 21, respectively. Between the disk holder 22 and the eject plate 21, a pair of eject springs 23 are bridged.

The disk holder 22 has a generally rectangular opening 224 formed at its center portion inward in the inserting direction A. The opening 224 is located at a position corresponding to the upper carriage 15U of the carriage assembly 15 and extends in the predetermined radial direction C. The opening 224 is surrounded by a generally U-shaped protruding edge 225 protruding upward from the principal surface 220 of the disk holder 22 along the periphery of the opening 224. On the other hand, the carriage assembly 15 has a pair of lateral arms 153 extending in a lateral direction. The lateral arms 153 are located on or above the protruding edge 225. In the state where the flexible disk is ejected from the disk holder 22, the lateral arms 153 are engaged with the protruding edge 225 to separate the upper and the lower magnetic heads 14 from each other, as will later be described. In addition, the disk holder 22 has an opening 226 formed inward in the inserting direction A at a right-hand side of the opening 224. The opening 226 has such a shape as to allow the rotation of a lever part of the eject lever which will later be described.

On the main frame 13, the eject lever depicted at 24 is rotatably arranged in the vicinity of the carriage assembly 15. Specifically, the main frame 13 is provided with a rod pin 134 standing up and extending upward from the upper surface thereof. The eject lever 24 comprises a cylindrical part 240 receiving the rod pin 134 fitted therein, an arm part (lever part) 241 extending from the cylindrical part 240 in a radial direction, a projecting part 242 formed at a free end of the arm part 241 to extend upward, and the arc-shaped locking part 243 extending from a free-end side of the arm part 241 in a circumferential direction. In the eject lever 24, an eject lever spring 25 is fitted around the cylindrical part 240 to urge the eject lever 24 in the counterclockwise direction in the figure. The projecting part 242 of the eject lever 24 is loosely fitted in the opening 226 of the disk holder 22. The projecting part 242 is engaged with an upper end of a right-hand edge of a shutter in the flexible disk, which will later be described, to controllably open and close the shutter. In addition, as shown in FIG. 1, a screw 26 is inserted into a tip of the rod pin 134 to prevent the eject lever 24 from being released from the rod pin 134.

The main frame 13 is provided with a front panel 27 attached to its front end portion. The front panel 27 has an opening 271 for insertion and ejection of the flexible disk and a door 272 for closing the opening 271. The front panel 27 is provided with an eject button 28 protruding therefrom to be movable backward and forward. The eject button 28 is fitted in a protruding part 214 protruding forward from a front end of the eject plate 21.

Figure 3:
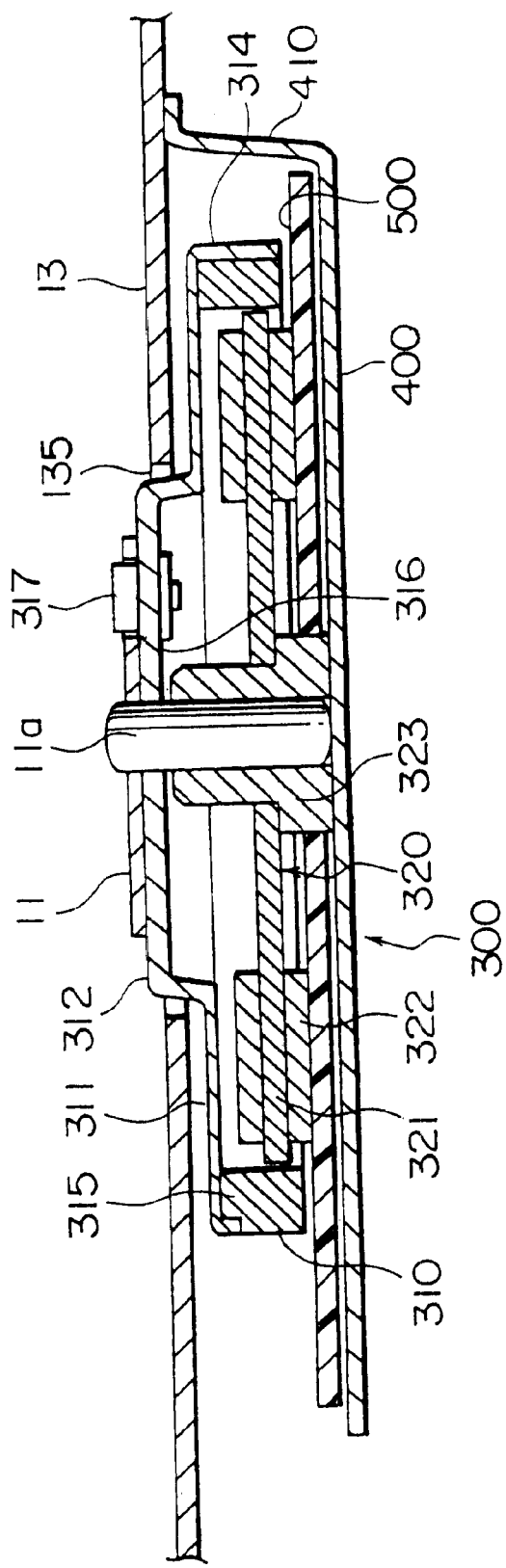
FIG. 3 is a sectional view of the disk drive illustrated in FIGS. 1 and 2, showing the relationship between a main frame and a drive motor mounted thereto.

Next referring to FIG. 3, description will be made of the drive motor used in the disk drive mentioned above.

The drive motor 300 illustrated in the figure comprises a rotor 310 and a stator 320 coupled with the rotor 310. The rotor 310 comprises a disk-shaped metal casing 311 having a trapezoidal-section portion 312 protruding upward from its center area. The trapezoidal-section portion 312 has a generally trapezoidal section. To an upper surface of the trapezoidal-section portion 312, the disk table 11 is fixedly attached. The main frame 13 is provided with a circular opening 135 which allows only an upper part of the trapezoidal-section portion 312 to protrude upward from the upper surface of the main frame 13. As a consequence, the disk table 11 protrudes above the upper surface of the main frame 13.

The rotor 310 is coupled with the rotation shaft 11a made of metal and integrally fixed thereto at its center to penetrate through the casing 311 and the disk table 11. Specifically, when the disk table 11 is formed from a plastic magnet by injection molding, the casing 311 and the rotation shaft 11a are integrally coupled to the disk table 11. The casing 311 has a cylindrical body 314 formed at its periphery to extend downward. A ring-shaped permanent magnet 315 is attached to an inner surface of the cylindrical body 314. The permanent magnet 315 has a side surface provided with a main magnetization area extending in a circumferential direction. The cylindrical body 314 is partially recessed to form a plurality of recessed portions through which the main magnetization area is partially exposed and protruded to serve as a plurality of magnetic poles.

The permanent magnet 315 has a bottom surface provided with a motor-servo magnetization area extending in the circumferential direction. In case where the stator 320 which will later be described has 15 magnetic poles, the main magnetization area has 20 poles (10 N poles and 10 S poles). On the other hand, the motor-servo magnetization area has 120 poles (60 N poles and 60 S poles) irrespective of the number of the poles of the stator 320. The main magnetization area and the motor-servo magnetization area may be called a drive magnetization area and a detection magnetization area, respectively.

The trapezoidal-section portion 312 has a lower surface to which an arm 316 is attached. The arm 316 is provided with a drive roller 317 rotatably coupled therewith. The trapezoidal-section portion 312 and the disk table 11 are provided with generally rectangular holes (not shown), respectively. Through these holes, the drive roller 317 protrudes above the disk table 11. The flexible disk loaded in the disk drive is placed on the disk table 11. The drive roller 317 is fitted into a hole formed in a hub (not shown) of the flexible disk to drive and rotate the magnetic disk medium.

On the other hand, the stator 320 is attached to a motor frame 400 made of metal and fixed to the lower surface of the main frame 13. Specifically, the stator 320 is formed on a printed wiring board 500 mounted on a principal surface of the motor frame 400. The stator 320 comprises a core assembly including a plurality of stator cores 321 extending in a radial direction, a plurality of stator coils 322 wound around the stator cores 321, respectively, and a bearing portion 323 receiving the rotation shaft 11a. The motor frame 400 has a plurality of fixing portions 410 each of which has an inverted L-shape and extends upward from a peripheral edge of the motor frame 400 to be brought into contact with the lower surface of the main frame 13.

As described above, the motor frame 400 for mounting the drive motor 300 is used in addition to the main frame 13. In other words, the motor frame 400 is formed as a separate component different from the main frame 13. Only the trapezoidal-section portion 312 of the rotor 310 of the drive motor 300 is protruded upward from the upper surface of the main frame 13 through the circular opening 135. The main frame 13 and the motor frame 400 may be called a main chassis and a motor base, respectively.

Figure 4:
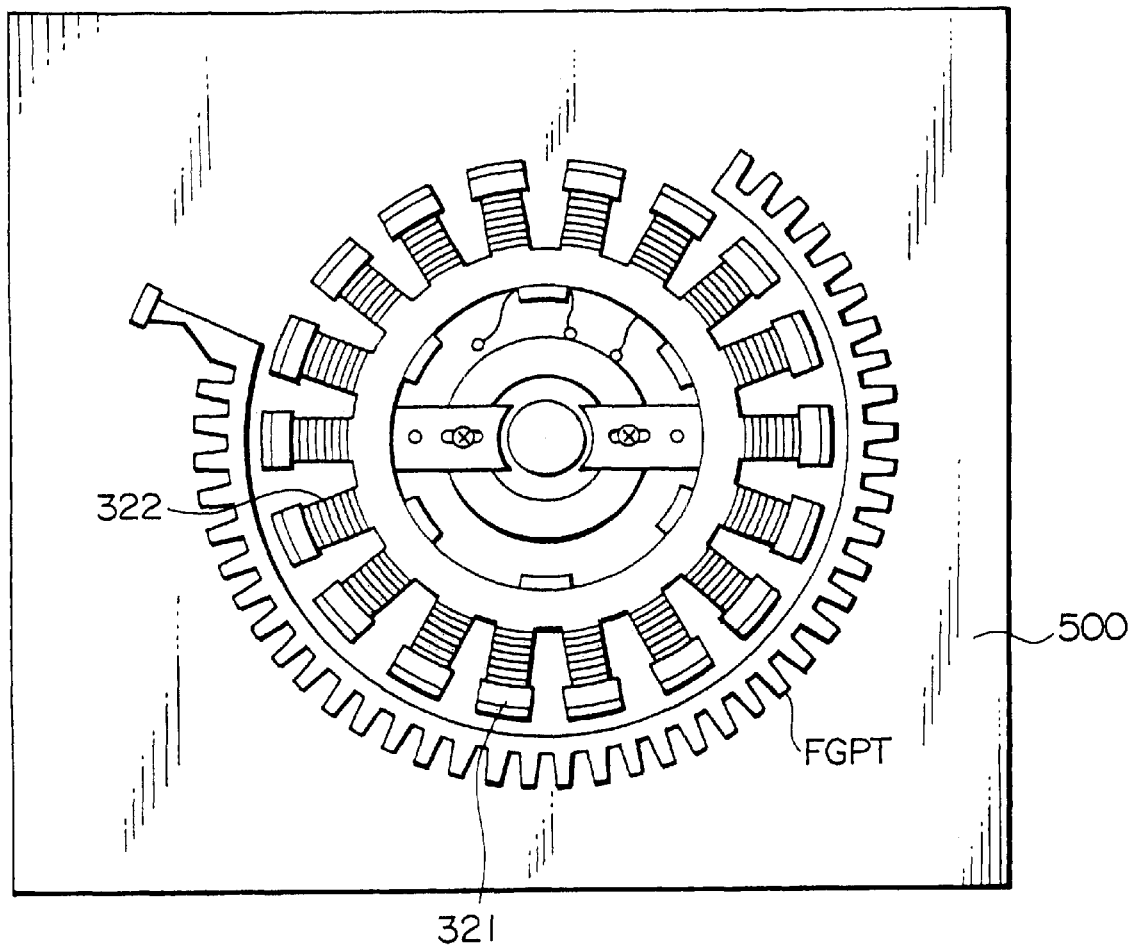
FIG. 4 is a plan view for describing the structure of a stator of the drive motor illustrated in FIG. 3.

Referring to FIG. 4, the printed wiring board 500 has a frequency generating pattern FGPT formed thereon around the stator 320 of the drive motor 300. In other words, the frequency generating pattern FGPT is faced to the motor-servo magnetization area (detecting magnetization area) of the permanent magnet 315 with a predetermined distance left therebetween. In the example being illustrated in FIG. 4, the number of poles of the stator 320 is equal to 18. In this case, the main magnetization portion of the rotor 310 has 24 poles. As described above, in case where the number of poles of the stator 320 is equal to 15, the main magnetization portion of the rotor 310 has 20 poles.

Figure 5A:
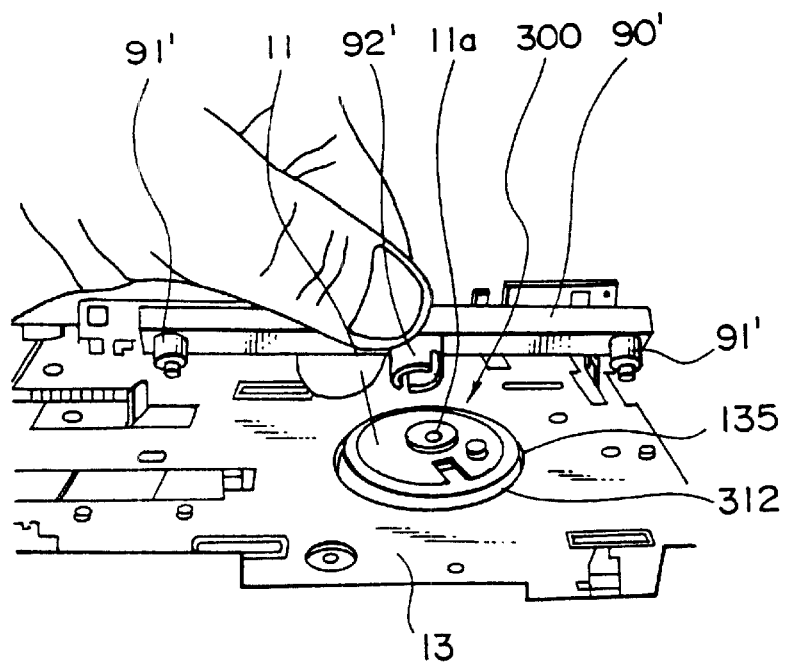
FIG. 5A is a perspective view for describing a conventional method of mounting the drive motor and shows the state immediately before the stator is positioned by a jig.
Figure 5B:
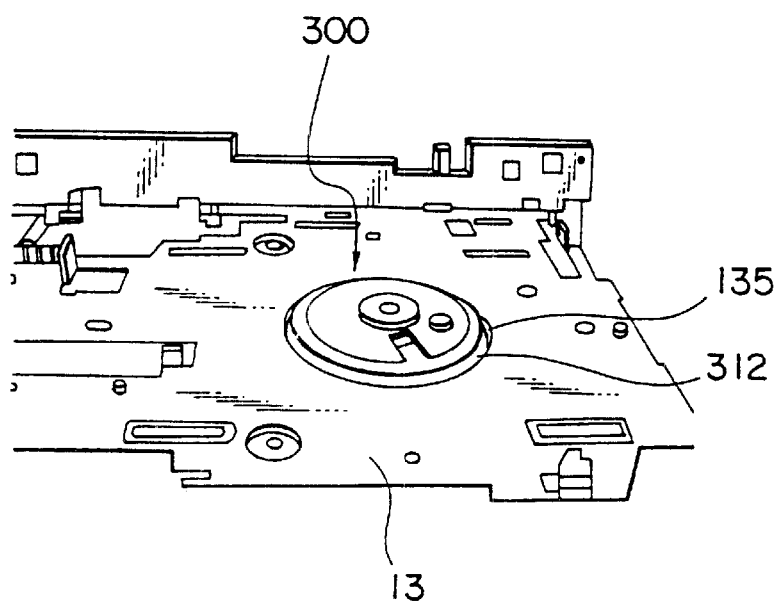
FIG. 5B is a perspective view showing the state after the stator is positioned by the jig.

In the conventional disk drive described above, the drive motor 300 is mounted to the main frame 13 in the following manner. Referring to FIGS. 5A and 5B, at first the drive motor 300 is mounted and fixed to the motor frame 400 separate from the main frame 13. Thereafter, the motor frame 400 is positioned with respect to the main frame 13 by the use of a jig 90' and, in this state, fixed to the main frame 13 by the use of a screw. The jig 90' comprises a pair of first engaging portions 91' to be engaged with the main frame 13 and a second engaging portion 92' to be engaged with the rotation shaft 11a of the drive motor 300 or the disk table 11 integral with the rotation shaft 11a.

Upon mounting and positioning the drive motor 300, the first engaging portions 91' of the jig 90' are engaged with the main frame 13 while the second engaging portion 92' is engaged with the rotation shaft 11a or the disk table 11. Thus, the drive motor 300 is positioned with respect to the main frame 13 by the use of the rotation shaft 11a as a reference. In this state, the motor frame 400 is fixed to the main frame 13 by the use of a screw.

Next referring to FIGS. 6A through 6C, 7A, and 7B, description will be made of a method of mounting a drive motor according to an embodiment of the present invention. Similar parts are designated by like reference numerals and description thereof will be omitted.

Figure 6A:
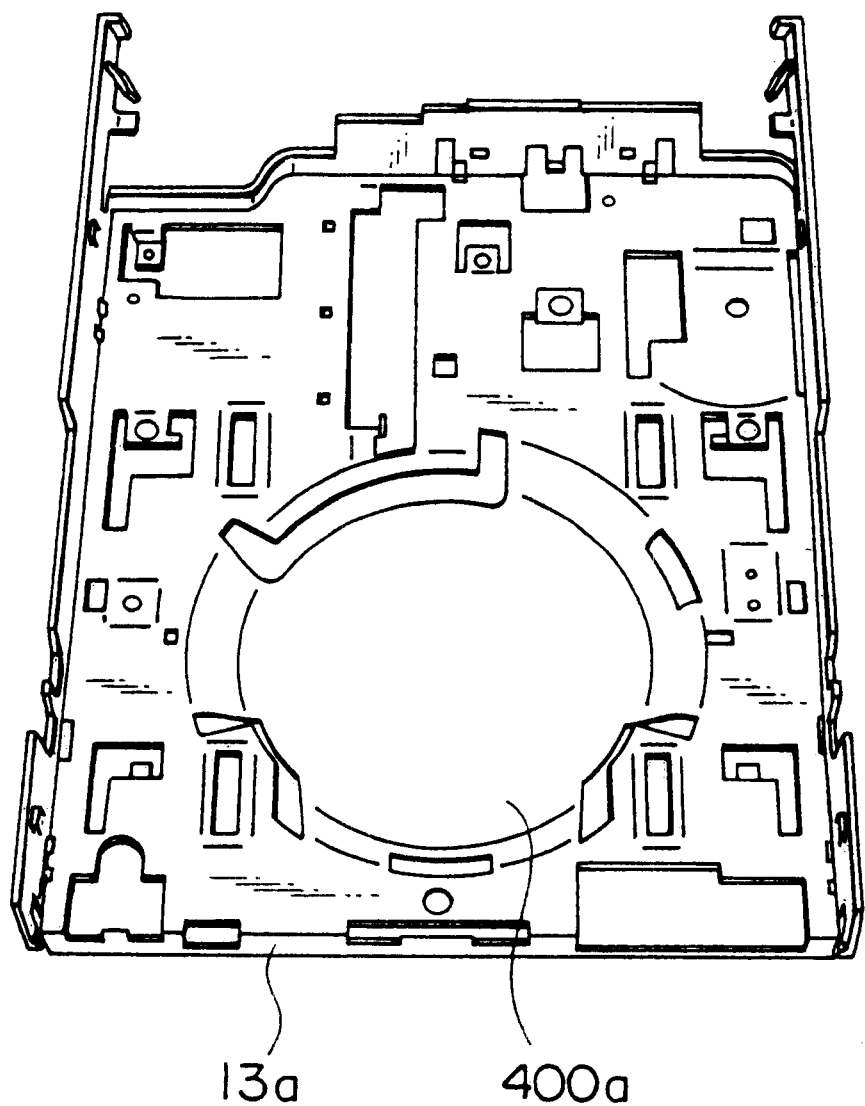
FIGS. 6A, 6B, and 6C are perspective views in which a main frame used in a method of mounting a drive motor according to one embodiment of the present invention is seen in different directions, respectively.
Figure 6B:
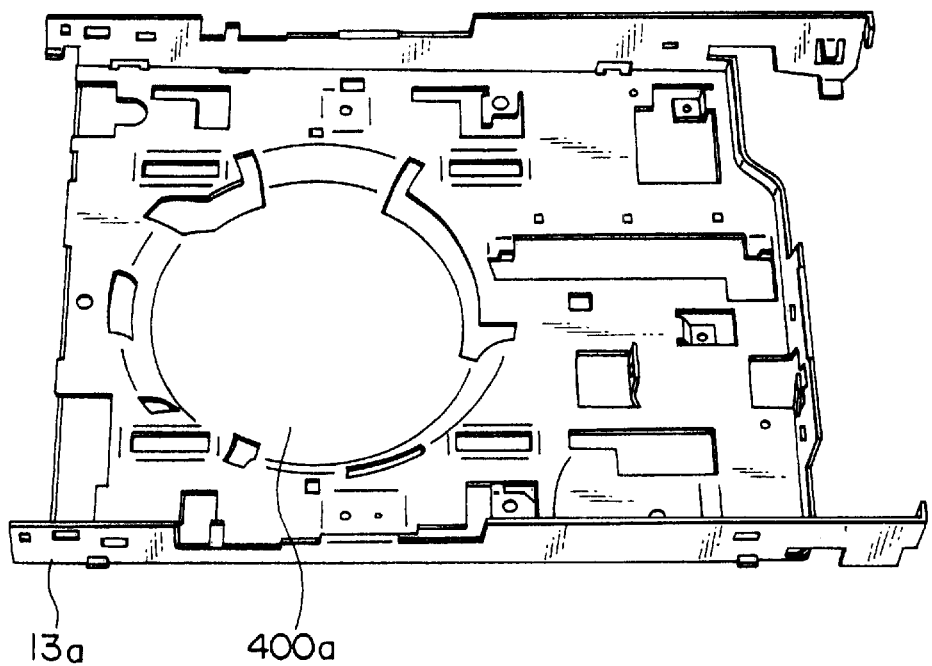
Figure 6C:
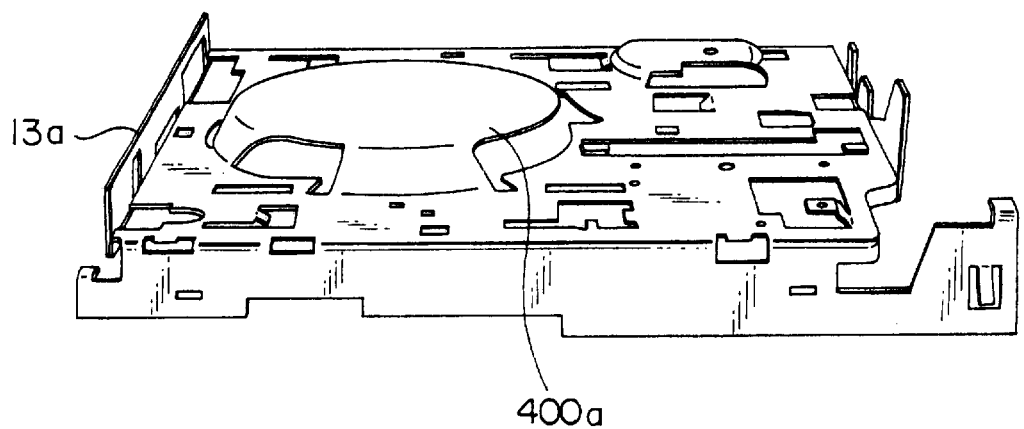

At first, preparation is made of a frame member illustrated in FIGS. 6A thorough 6C. The frame member comprises a main frame portion 13a corresponding to the main frame 13 in the conventional disk drive and a motor frame portion 400a formed integral with the main frame portion 13a to receive a drive motor. The motor frame portion 400a is similar in function to the motor frame 400 in the conventional disk drive. The motor frame portion 400a can be formed by a drawing process to depress a part of the main frame portion 13a.

Since the motor frame portion 400a for receiving the drive motor and the main frame portion 13a are integrally formed as a single-piece component, it is possible to reduce the number of components of the disk drive and the number of assembling steps of the disk drive. Since the drive motor can be directly coupled to the motor frame portion 400a, it is possible to suppress the variation in characteristics of the drive motor and stabilize the characteristics.

Next, description will be made of an operation of mounting the drive motor.

Figure 7A:
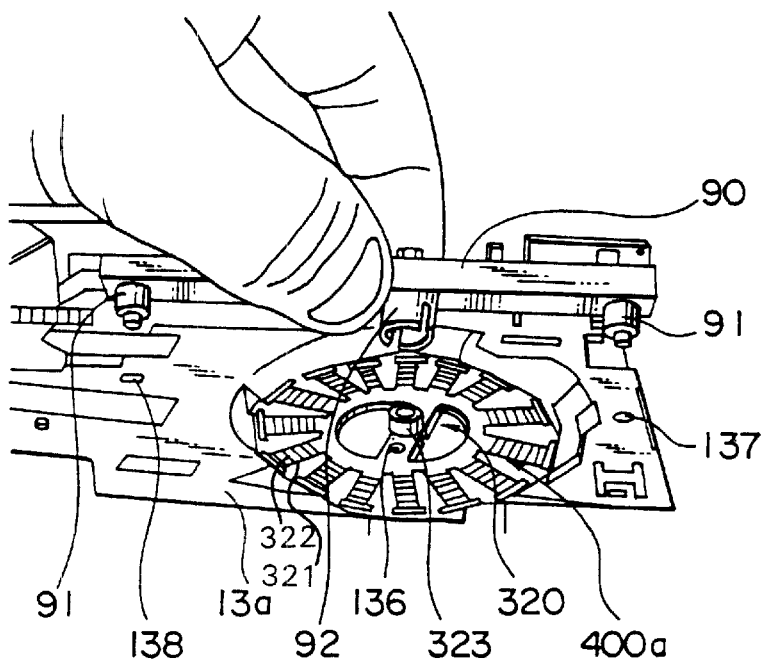
FIG. 7A is a perspective view showing the state immediately before a stator is positioned by a jig with respect to the main frame illustrated in FIGS. 6A, 6B, and 6C.

At first referring to FIG. 7A, a stator 320 of the drive motor is provisionally or temporarily fixed to the motor frame portion 400a by the use of a bolt 136. The stator 320 illustrated in the figure is of the type in which a core assembly including a plurality of stator cores 321 is formed separately from a bearing portion 323. In this case, the core assembly is placed on the bearing portion 323. In this state, the core assembly and the bearing portion 323 are fastened to the motor frame portion 400a by the bolt 136. It is noted here that a stator coil 322 is preliminarily wound around each stator core 321 of the core assembly.

Next, the bearing portion 323 is positioned by the use of a jig 90. The jig 90 has an elongated shape and includes a pair of first engaging portions 91 and 91' in the vicinity of opposite ends thereof and a second engaging portion 92 at an intermediate portion. One first engaging portion 91 has an end fitting portion to be fitted into a circular positioning hole 137 formed in the main frame portion 13a while the other first engaging portion 91' has an end fitting portion to be fitted into a long positioning hole 138 formed in the main frame portion 13a. The second engaging portion 92 receives an upper end of the bearing portion 323 to be fitted to the bearing portion 323.

Figure 7B:
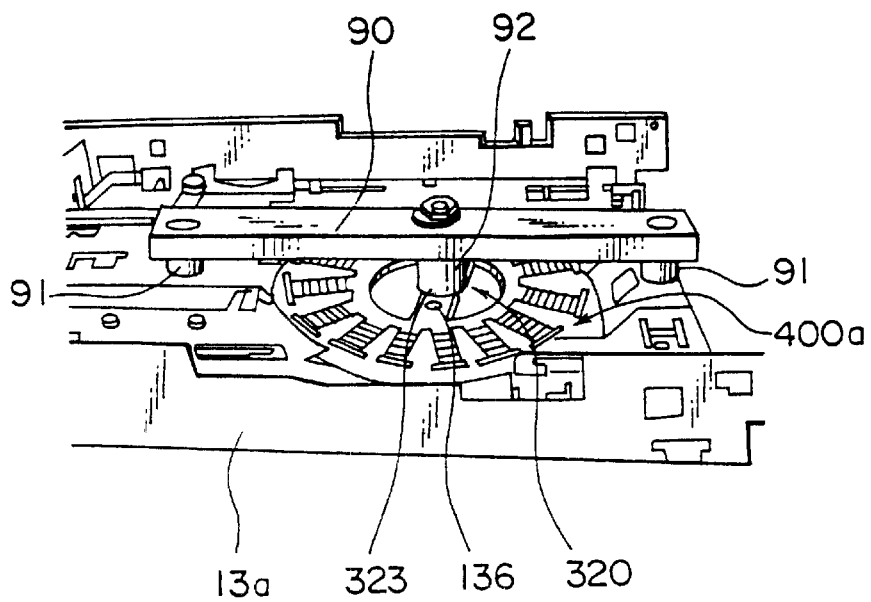
FIG. 7B is a perspective view showing the state after the stator is positioned with respect to the main frame illustrated in FIGS. 6A, 6B, and 6C.

Upon positioning the bearing portion 323, the first engaging portions 91 and 91' are fitted to the circular positioning hole 137 and the long positioning hole 138, respectively. Simultaneously, the second engaging portion 92 and the bearing portion 323 are fitted to each other. As a consequence, as illustrated in FIG. 7B, the bearing portion 323 is accurately positioned at a predetermined position on the motor frame portion 400a. Accordingly, the core assembly is also positioned and the whole of the stator 320 is positioned. In this state, the bolt 136 is tightly fastened to fix the stator 320 to the motor frame portion 400a.

Next, preparation is made of a rotor 310 in which a casing 311, a permanent magnet 315, a disk table 11, a rotation shaft 11, and so on are preliminarily assembled. The rotation shaft 11a of the rotor 310 is inserted into the bearing portion 323. As a consequence, the rotor 310 is also positioned with respect to the motor frame portion 400a and the drive motor is finished.

As described above, use is made of the frame member comprising the main frame portion 13a and the motor frame portion 400a as an integral component. The drive motor is mounted and positioned by the use of the bearing portion 323 of the stator 320 as a reference. Therefore, mounting and positioning of the drive motor to the disk drive can easily and accurately be carried out.

Since the frame member comprising a single integral component including the main frame portion 13a and the motor frame portion 400a, the number of components of the disk drive and the number of assembling steps can be reduced. In addition, the motor can be directly mounted to the main frame portion 13a. It is therefore possible to suppress variation in characteristics of the motor and to stabilize the characteristics. While the present invention has thus far been described in connection with a single embodiment thereof, it will readily be possible for those skilled in the art to put the present invention into practice in various other manners. For example, it is preferable that, although the frequency generating pattern is formed on the printed wiring board in the conventional disk, the frequency generating pattern is replaced by other means which can exhibit the equivalent function. It is a matter of course that the frequency generating pattern formed on the printed wiring board can be used. The motor frame portion illustrated in the figure has a circular shape but may have any other appropriate shape, such as a polygonal shape or an elliptical shape, depending upon the depth and the material of the motor frame portion. Similarly, the main frame portion may have various shapes other than that illustrated in the figure. It will readily be understood that the main frame portion and the motor frame portion can be connected not only in the illustrated manner but also in various other manners.

The entire disclosure of Japanese Patent Application No. 11-372578 filed on filed on Dec. 28, 1999 including specification, claims, drawings and summary are incorporated herein by reference in its entirety.

What is claimed is:

1. A method of mounting a drive motor to a frame member included in a disk drive which is for driving a flexible disk, said drive motor comprising a stator fixed to said frame member and having a bearing portion, a rotation shaft rotatably supported by said bearing portion, and a rotor coupled to said rotation shaft for being engaged with said flexible disk, said method comprising the steps of:

forming said frame member to have a main frame portion and a motor frame portion integrally formed to said main frame portion, said main frame portion defining a position of said flexible disk in said disk drive;

preparing a jig adapted to engage with said main frame portion and said bearing portion;

engaging said jig with said main frame portion and said bearing portion to position said stator relative to said motor frame portion;

fixing said stator to said motor frame portion; and coupling said rotation shaft to said bearing portion.

2. The method according to claim 1, wherein said jig has a first and a second engaging portion to be engaged with said main frame and said bearing portion, respectively.

3. The method according to claim 2, wherein said main frame portion is formed with a circular positioning hole and a long positioning hole, said first engaging portion including two fitting portions, the engaging step comprising the step of fitting said fitting portions into said circular and said long positioning holes, respectively.

4. The method according to claim 3, wherein the engaging step further comprises the step of fitting said second engaging portion over said bearing portion.

5. The method according to claim 1, wherein said method further comprises the step of provisionally fixing said stator to said motor frame portion before said jig is engaged with said main frame portion and said bearing portion.

6. The method according to claim 5, wherein said stator further has a core assembly formed separately from said bearing portion, said core assembly comprising a plurality of stator cores and a plurality of stator coils wound around said stator cores, respectively, the provisionally fixing step comprising the steps of:

placing said core assembly on said bearing portion; and fastening said core assembly and said bearing portion to said motor frame portion by at least one bolt.

* * * * *